Patented Aug. 11, 1931

1,817,995

UNITED STATES PATENT OFFICE

ARTHUR LÜTTRINGHAUS, OF MANNHEIM, AND PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PROCESS FOR THE PRODUCTION OF VAT DYESTUFFS

No Drawing. Application filed July 22, 1927, Serial No. 207,812, and in Germany August 17, 1926.

We have found that practically insoluble condensation products of high melting point, which as a rule may be employed as vat dyestuffs, are obtained by heating anthrones containing a further nucleus attached to the meso- and 1-positions, at least to the latter by means of a nitrogen atom, and halogenated in the 2-position, in which anthrone derivatives the said further nucleus may contain one or more nitrogen atoms, such for instance as 2-halogen-anthrapyrimidones, 2-halogen-anthrapyridones, 2-halogen-anthrapyrimidines, 2-halogen-coeramidonines and others, with metals or agents which react similarly to metals.

It is sometimes advantageous, and when 2-halogen-pyrazolanthrones are employed as initial materials, even essential, to employ acyl derivatives of the said compounds for this process. When heating is continued for a longer time, such acyl groups are split off either in part or completely, or, if necessary, the reaction product is finally saponified.

The following examples will further illustrate how this invention may be carried out in practice, but the invention is not limited to these examples. The parts are by weight.

Example 1

1 part of acetyl-2-brom-pyrazolanthrone, melting at from 209 to 211° C., which may be obtained, for example by heating 2-brompyrazolanthrone with acetic anhydride and a small amount of concentrated sulfuric acid, is thoroughly mixed with 1 part of copper and 1 part of naphthalene, whereupon the mixture is heated to from 230° to 250° C. until the condensation is complete. The reaction mixture is freed from naphthalene and copper, according to the known methods, and the residue recrystallized from monochlorbenzene. The acetyl compound thus obtained consists of yellowish crystalline leaflets, which dissolve in sulfuric acid with reddish orange coloration. On pouring the sulfuric acid solution into water, a yellow dyestuff corresponding to that obtainable by heating pyrazolanthrone with caustic alkalies, separates out.

The initial material probably has the structure corresponding to the formula given in the following scheme, which illustrates the probable progress of the reaction:

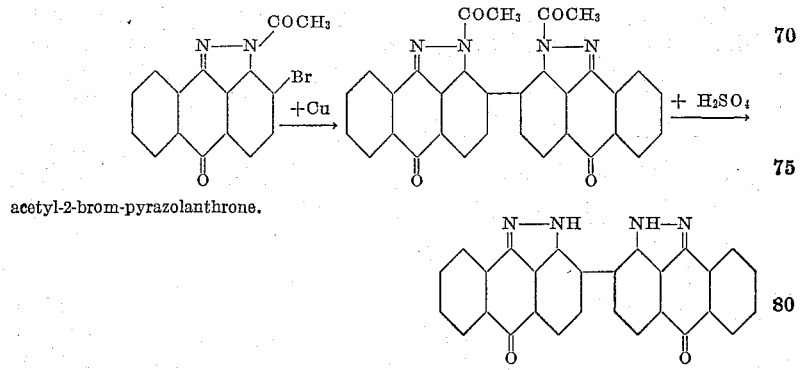

acetyl-2-brom-pyrazolanthrone.

Example 2

1 part of 2-brom-anthrapyrimidone-methyl ether melting at from 285° to 290° C., which may be obtained, for example, by methylating 2-brom-anthrapyrimidone, is thoroughly mixed with 1 part of copper powder and 2 parts of naphthalene, whereupon the mixture is heated to 250° C. with exclusion of air until the condensation is complete. The melt is freed from naphthalene and copper, according to the known methods, and the residue recrystallized from trichlorbenzene. The dyestuff thus obtained consists of yellow needles, which dissolve in sulfuric acid with yellowish brown coloration, and produce on cotton bright yellow dyeings very fast to chlorine and boiling with soda from the brownish-red vat.

The initial material probably has the structure corresponding to the formula given in the following scheme, which illustrates the probable progress of the reaction:

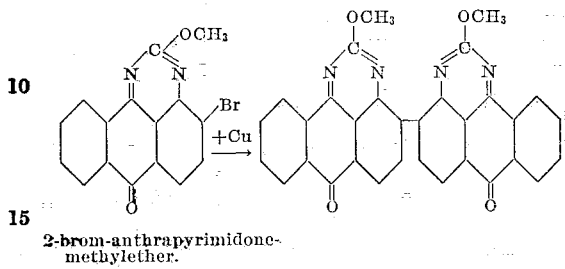

2-brom-anthrapyrimidone-methylether.

*Example 3*

1 part of 2-iodo-methyl-anthrapyrimidine melting at from 210° to 215° C. and probably having the formula given below, which may be obtained for instance by boiling 2-diazo-methyl-anthrapyrimidine with an aqueous solution of potassium iodide, is thoroughly mixed with 1 part of copper and 2 parts of naphthalene, and this mixture is heated to 200° to 205° C. until the condensation is complete. The dyestuff is separated according to the method described in Example 2. It dissolves in sulfuric acid with yellow-coloration and dyes cotton lemon yellow shades of excellent fastness from the yellowish-brown vat.

The probable progress of the reaction is illustrated by the following scheme:

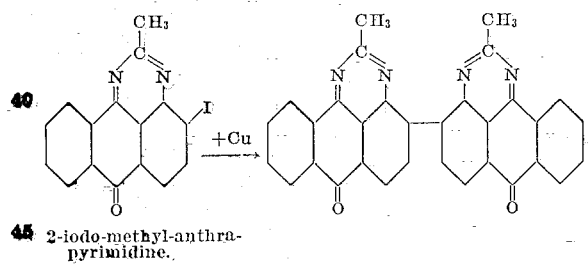

2-iodo-methyl-anthra-pyrimidine.

*Example 4*

1 part of 2-iodo-coeramidonine melting at from 203° to 205° C. and probably having the formula given below, which may be obtained for instance from 1-anilido-2-iodo-anthraquinone by treatment with sulfuric acid, is thoroughly mixed with 1 part of copper and 1 part of naphthalene, and this mixture heated for some time to 230° to 240° C. The crude reaction product, separated according to the method described in Example 2, is purified by fractional precipitation from sulfuric acid. It dissolves with brownish-red coloration in sulfuric acid and dyes cotton from an orange red vat the same shade, which on exposure to the air changes to a bright reddish-brown.

The probable progress of the reaction is illustrated by the following scheme:

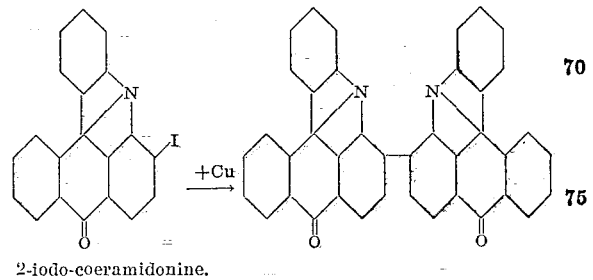

2-iodo-coeramidonine.

The same dyestuff is obtained, but in a somewhat less pure state, by heating 2-brom-coeramidonine melting at 210° C. with copper and naphthalene in the manner just described.

A quite analogous, practically insoluble condensation product, of high melting point, which dyes cotton from the vat in light yellow shades is obtained from 2 brom-anthra-pyridone-methyl ether (melting at from 255° to 260° C., and obtainable for instance by methylating 2-brom-anthrapyridone) by heating with copper and naphthalene.

What we claim is:—

1. A process for the manufacture of practically insoluble condensation products of high melting point having the character of vat dyestuffs which comprises heating an anthrone containing a further nucleus attached to the meso- and 1-positions, at least to the latter by means of a nitrogen atom, and halogenated in the 2-position, with copper, care being taken that in the case of pyrazol-anthrones the initial material is acylated on the nitrogen atom of the pyrazol ring.

2. A process for the manufacture of practically insoluble condensation products of high melting point having the character of vat dyestuffs which comprises heating a 2-halogen-coeramidonine with copper.

3. As new articles of manufacture practically insoluble condensation products of high melting point having the character of vat dyestuffs, which are obtainable by heating 2-halogen-coeramidonines with copper.

4. As a new article of manufacture, a vat dyestuff which is obtainable by heating 2-iodo-coeramidonine with copper, dissolves with brownish-red coloration in sulfuric acid and dyes cotton bright reddish-brown shades.

In testimony whereof we have hereunto set our hands.

ARTHUR LÜTTRINGHAUS.
PAUL NAWIASKY.
ARTUR KRAUSE.